(12) United States Patent
Fang

(10) Patent No.: US 11,258,484 B2
(45) Date of Patent: Feb. 22, 2022

(54) POWER CONTROL TO A BEAM STEERING PHASED ARRAY ANTENNA IN SATELLITE APPLICATIONS

(71) Applicant: Metawave Corporation, Palo Alto, CA (US)

(72) Inventor: Jun Fang, Palo Alto, CA (US)

(*) Notice: Subject to any disclaimer, the term of this patent is extended or adjusted under 35 U.S.C. 154(b) by 249 days.

(21) Appl. No.: 16/359,998

(22) Filed: Mar. 20, 2019

(65) Prior Publication Data

US 2019/0296802 A1 Sep. 26, 2019

Related U.S. Application Data

(60) Provisional application No. 62/645,767, filed on Mar. 20, 2018.

(51) Int. Cl.
| | | |
|---|---|---|
| *H04B 7/04* | (2017.01) | |
| *H04B 7/0426* | (2017.01) | |
| *H04B 7/005* | (2006.01) | |
| *H04B 7/185* | (2006.01) | |

(52) U.S. Cl.
CPC ............ *H04B 7/043* (2013.01); *H04B 7/005* (2013.01); *H04B 7/1851* (2013.01); *H04B 7/18543* (2013.01)

(58) Field of Classification Search
CPC ...... H04B 7/043; H04B 7/005; H04B 7/1851; H04B 7/18543; H04B 7/18515; H04B 7/0617; H04W 52/42
See application file for complete search history.

(56) References Cited

U.S. PATENT DOCUMENTS

| | | | | |
|---|---|---|---|---|
| 5,162,804 A | * | 11/1992 | Uyeda ..................... | H01Q 3/22 342/372 |
| 6,072,432 A | * | 6/2000 | Powell .................... | H01Q 19/10 342/373 |
| 6,381,212 B1 | * | 4/2002 | Larkin .................... | H03F 3/602 330/126 |
| 6,492,949 B1 | | 12/2002 | Breglia et al. | |
| 6,496,536 B2 | * | 12/2002 | Mollenkopf ......... | H04B 17/327 375/227 |
| 9,913,278 B2 | * | 3/2018 | Heninwolf .............. | H04B 7/04 |
| 10,283,861 B2 | * | 5/2019 | Derneryd ............. | H04B 7/0408 |
| 2003/0001773 A1 | * | 1/2003 | Harmon ............... | H04B 7/2041 342/352 |
| 2016/0278064 A1 | * | 9/2016 | Marsh ................ | H04B 7/18513 |

(Continued)

OTHER PUBLICATIONS

Angeletti, Piero et al., "A Survey of Multiport Power Amplifiers Applications for Flexible Satellite Antennas and Payloads", Conference: the 14th Ka and Broadband Communication Conference, Jan. 2008.

(Continued)

*Primary Examiner* — Jean B Corrielus
(74) *Attorney, Agent, or Firm* — Sandra Lynn Godsey

(57) ABSTRACT

Examples disclosed herein relate to a communication system including a transceiver module, a rearrangeable switch network coupled to the transceiver module, a power distribution network coupled to the rearrangeable switch network, and a plurality of Beam Steering Phase Array ("BSPA") antennas, each coupled to the power distribution network and dynamically controllable to generate beams according to a power regulation requirement for a set of satellites.

20 Claims, 8 Drawing Sheets

(56) References Cited

U.S. PATENT DOCUMENTS

2017/0047987 A1* 2/2017 Pellegrino .............. H03F 3/245
2020/0336201 A1* 10/2020 Yamamoto ......... H04B 7/18517

OTHER PUBLICATIONS

Egami, Shunichiro et al., "An Adaptive Multiple Beam System Concept", IEEE J. on Selected Areas in Communications, vol. SAC-5, No. 4, pp. 630-636, May 1987.
Fakoukakis, Fanourios E. et al., "Novel Nolen Matrix Based Beamforming Networks for Series-Fed Low SLL Multibeam Antennas", Progress in Electromagnetics Research B., vol. 51, 33-64, 2013.
Rave, Christian et al., "Architectures for Efficient Power Sharing in Active Multiple-Feed-per-Beam Satellite Antennas", 2016 21st International Conference on Microwave, Radar and Wireless Communications (MIKON), 2016, pp. 1-4, doi: 10.1109/MIKON.2016.7491944.
International Telecommunications Union, "Handbook on Satellite Communications, 3rd Edition", Apr. 2002.

\* cited by examiner

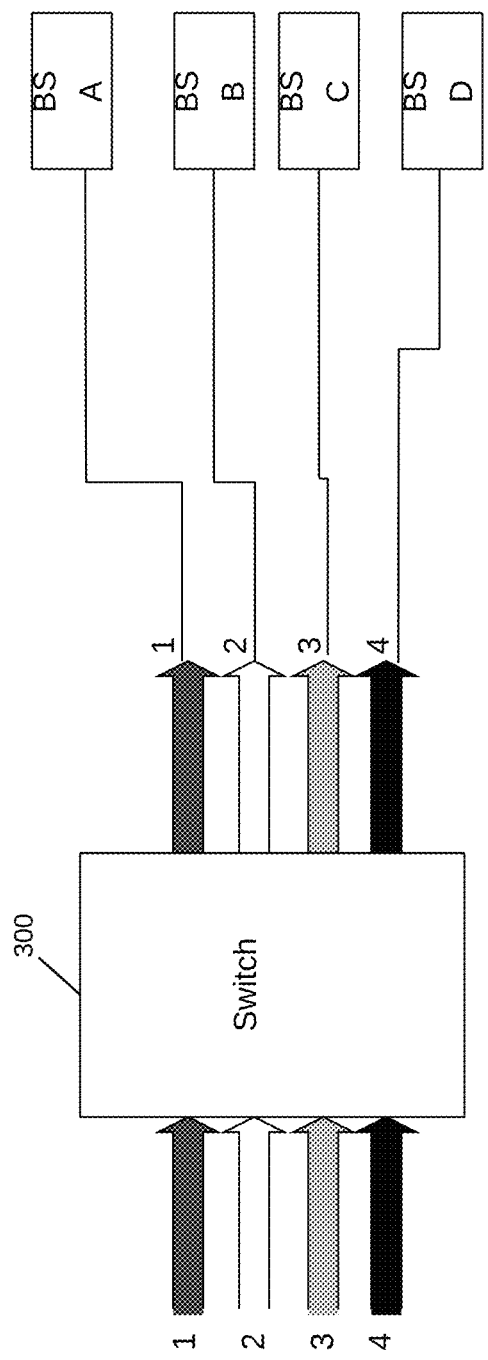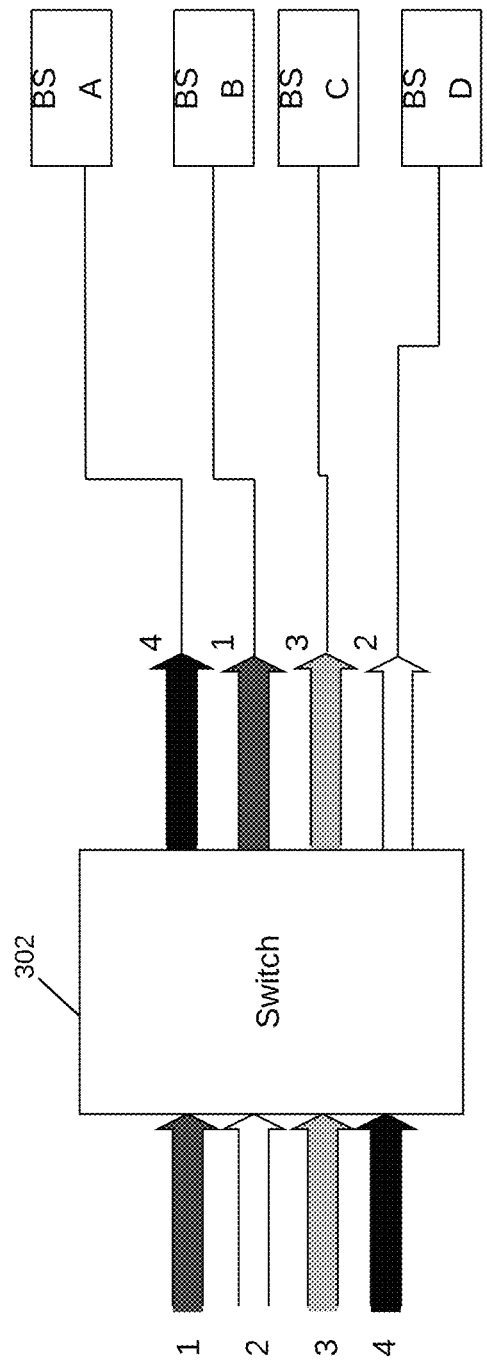

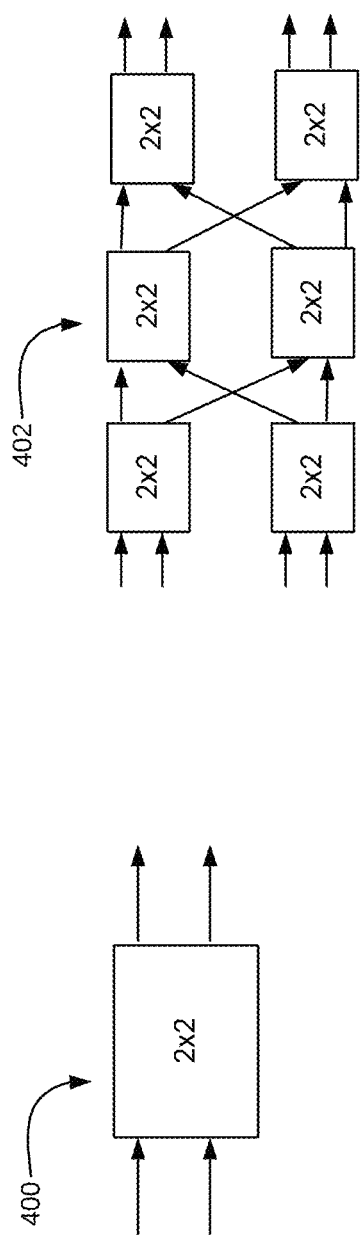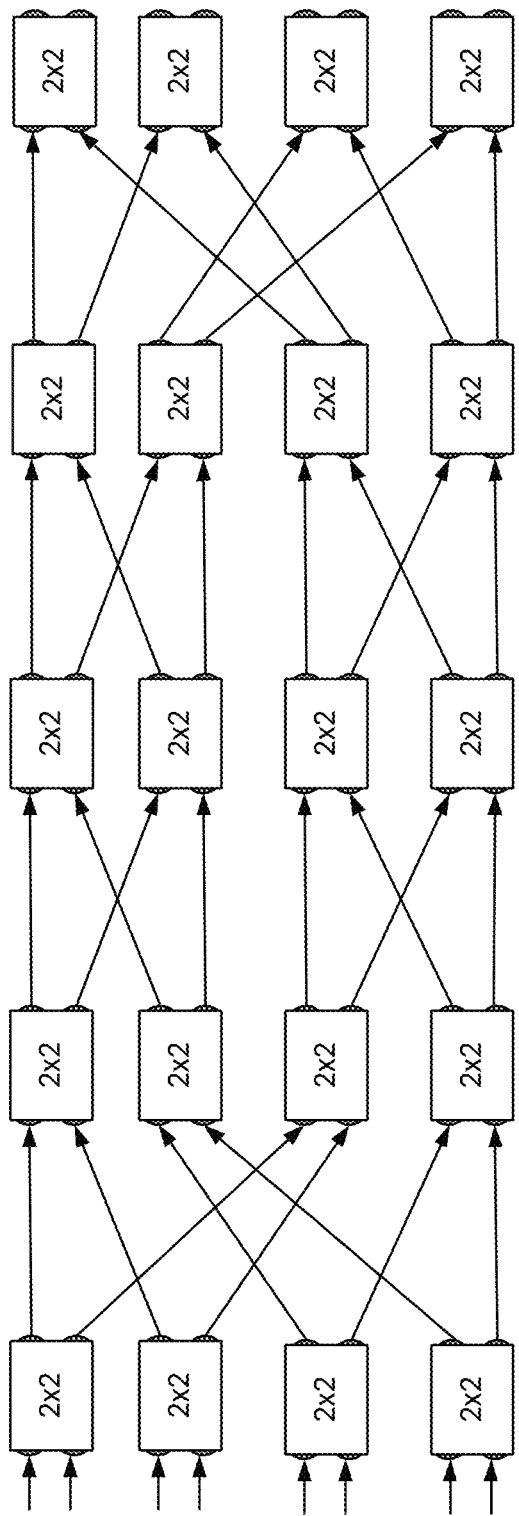
FIG. 4A
FIG. 4B

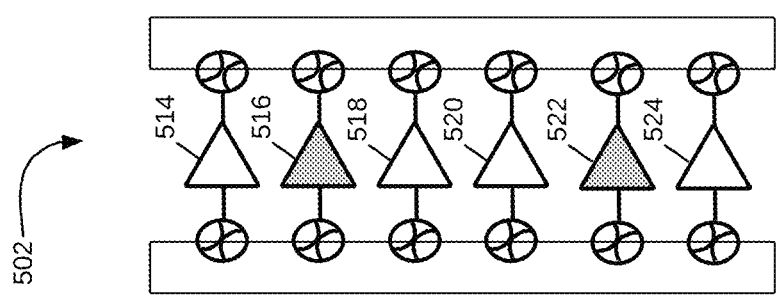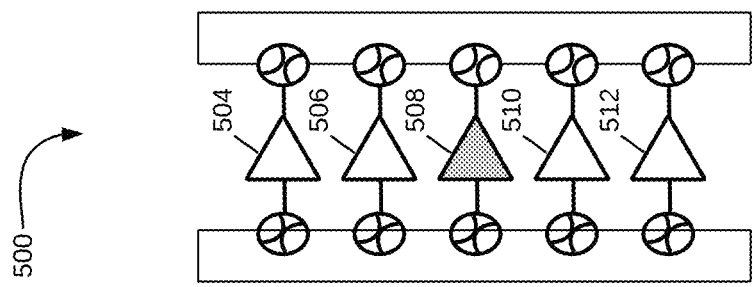
FIG. 5

POWER CONTROL TO A BEAM STEERING PHASED ARRAY ANTENNA IN SATELLITE APPLICATIONS

CROSS-REFERENCE TO RELATED APPLICATIONS

This application claims priority to U.S. Provisional Application No. 62/645,767, filed on Mar. 20, 2018, and incorporated herein by reference.

BACKGROUND

Low Earth Orbit ("LEO") satellite constellations have emerged as the new frontier for broadband Internet services. A LEO is an orbit around Earth with an altitude of 1,200 miles (2000 Km) or less, and an orbital period anywhere between 84 and 127 minutes. LEO satellites move very quickly relative to Earth's surface to stay in orbit. With a full trip around Earth in about 100 minutes, a single LEO satellite is likely in view of a user for about 10 minutes at a time. Providing broadband connectivity to users on Earth therefore requires a LEO satellite constellation capable of providing high directivity, handling satellite handoffs and managing propagation losses that occur between the satellites and ground stations on Earth.

A LEO satellite and a ground station on Earth both include antennas to transmit and receive signals to/from each other. The antenna system may operate in the millimeter wave spectrum covering frequencies between 30 and 300 GHz or a portion thereof. Achieving high directivity and gain in millimeter wave frequencies poses several design challenges, including providing power control methods and beam steering while minimizing losses and antenna squint.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIGS. 3A-B illustrate rearrangeable switch networks in accordance to various examples;

FIGS. 4A-B illustrate switch networks in accordance to various examples;

FIG. 5 is a schematic diagram of a power amplifier bank in accordance to various examples;

DETAILED DESCRIPTION

Figure 1:
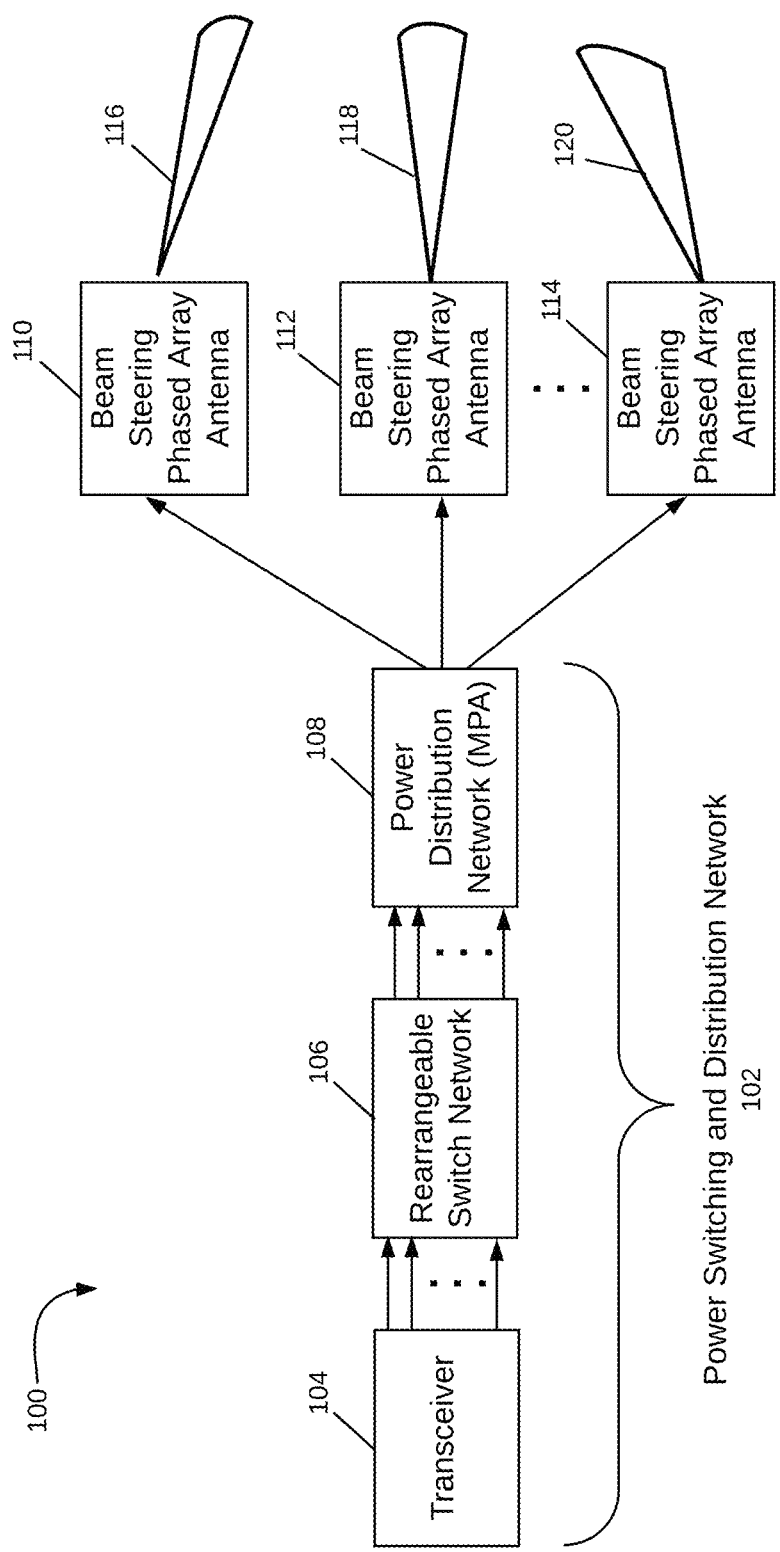
FIG. 1 is a schematic diagram of an antenna system in accordance to various examples.

Systems, apparatuses and methods for power control to a beam steering phased array antenna in satellite applications are disclosed. The systems, apparatuses and methods support the growing demands of satellite communications in the millimeter wave spectrum and enable the deployment of broadband wireless connectivity to users. In various examples, LEO satellites and/or ground stations are equipped with a novel Beam Steering Phased Array Antenna ("BSPA") to enable beamforming by using multiple elements to support high gain and narrow beam formation. Power control is provided with a multi-port amplification ("MPA") matrix to optimize antenna operation and reduce losses. These MPA matrices may be used for power distribution in various system configurations, including Multi-User Multiple-Input, Multiple-Output ("MU-MIMO") configurations.

The BSPA antennas disclosed herein provide high directional gain and narrow beams, enabling very high data rate spatial transmission in satellite communications, and in particular, in broadband mobile satellite systems, where satellites can move in orbits and communicate with ground stations, stationary or in mobility. Beams formed by BSPA antennas are steered by a certain angle to find ground stations as the communication satellite moves, such as for Satellite Communications on the Move ("SOTM") and LEO satellites. When beams are electronically steered, there may be a gain loss observed. Larger steering angles result in higher gain loss. These losses may be compensated by adjusting the power using a power amplifier, which in the disclosed examples is part of a MPA matrix or system. Electronic beam steering also eliminates mechanical beam steering, and thereby reduces mass, volume, and power for controlling and operating subsystems and antenna arrays.

This MPA system provides power level control, failure resilience, and power combining/dividing capabilities over a range of complex operational requirements. In multiple beam operations of the SOTM systems, beam handover is required when satellites move in beam operations of the SOTM systems or out of the sight of a ground station. Beam swapping can be performed for the handover procedure where a new beam is formed and steered to a new ground station which takes over another beam pointing to another ground station which is about to become out of sight of the satellite. As described in more detail herein below, the various examples propose and disclose a method using beam switching with a Benes network topology to support seamless handover scenarios.

When beams are electronically steered, a gain loss is usually observed, which is proportional to $\cos(\theta)$, with $\theta$ referring to the steering angle. The larger the steering angle, the higher the gain loss will be. At the same time, the larger the steering angle, the farther the distance between the satellite and the ground station, or terminal. In space propagation, the propagation loss is increased by six (6) dB when the distance is doubled. For example, for a LEO satellite moving in its orbit at an elevation angle of thirty degrees (30°), the beam steering loss is about three (3) decibels (dB) and the LEO-terminal distance as doubled implies about six (6) dB path loss, thereby totalizing a loss of up to nine (9) dB. These losses can be compensated by adjusting the power, as one of the most effective possible solutions, by using an MPA matrix. The proposed solution based on an MPA system provides power level control, failure resilience, and power combining/dividing features to meet very complex operational requirements.

It should be noted that antennas used in space applications, such as satellites, require large-scale beamforming with high directivity gain. These antennas are often designed for beam steering and beam switching, where power control is a key consideration. The goal is to distribute power to the individual antenna elements and to control individual antenna elements (or groups of antenna elements) with individualized power levels.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

FIG. 1 illustrates a schematic diagram of an antenna system 100 in accordance with various examples. In one or more examples of the present disclosure, for a satellite with several links pointing to several different ground stations, a power switching and distribution network 102 may be employed. The power switching and distribution network 102 may comprise a transceiver 104, a rearrangeable switch network 106, and a power distribution network 108. The power distribution network 108 is coupled to a plurality of Beam Steering Phased Array ("BSPA") antennas 110-114, which each transmit (radiate) and/or receive (detect) Electromagnetic ("EM") beams 116-120. In one or more examples and as described in more detail below, the BSPA antennas 120 may be a metastructure antenna or any other phased array antenna capable of beam steering in millimeter wave frequencies. A metastructure, as generally defined herein, is an engineered, non- or semi-periodic structure that is spatially distributed to meet a specific phase and frequency distribution. In addition, it should be noted that, in some examples, lasers and/or detectors may be employed by the disclosed antenna system 100 instead of BSPA antennas 110-114, as is shown in FIG. 1. BSPA antennas 110-114 may be implemented in a BSPA antenna module as described in more detail below with reference to FIG. 6.

The rearrangeable switch network 106, or configurable network, is used for signal source permutation. The power distribution network 108 is a MPA system, and is responsible for power distribution and power level control of the beams 116-120. This feature of power distribution and control may also provide redundancy to achieve fault protection by having parallel amplification. It should be noted that there may be a variety of different designs for the power distribution network 108, such as designs utilizing hybrid de-couplers and power amplifiers.

As illustrated in FIG. 1, multiple signal streams are provided from transceiver 104 to a switch network 106. The rearrangeable switch network 106 enables a variety of configurations and connections from input to output, and thus supports signal source permutations. A controller (not shown) may be used to control the specific permutations depending on application, signal source and operational considerations. The various permutations are then input to the power distribution network 108, also referred to as an MPA.

The MPA 108 is a bank of power amplifiers which are connected to an input matrix and output matrix. An MPA uses parallel amplification of signals according to a stack of Power Amplifiers ("PAs") so as to achieve power sharing among the multiple output ports. The input signals are transformed by an Input Multiport Network ("INET") and presented to a stack of High Performance Amplifiers ("HPAs"), whereupon after amplification the signals are recombined by the Output Multiport Network ("ONET').

Figure 2:
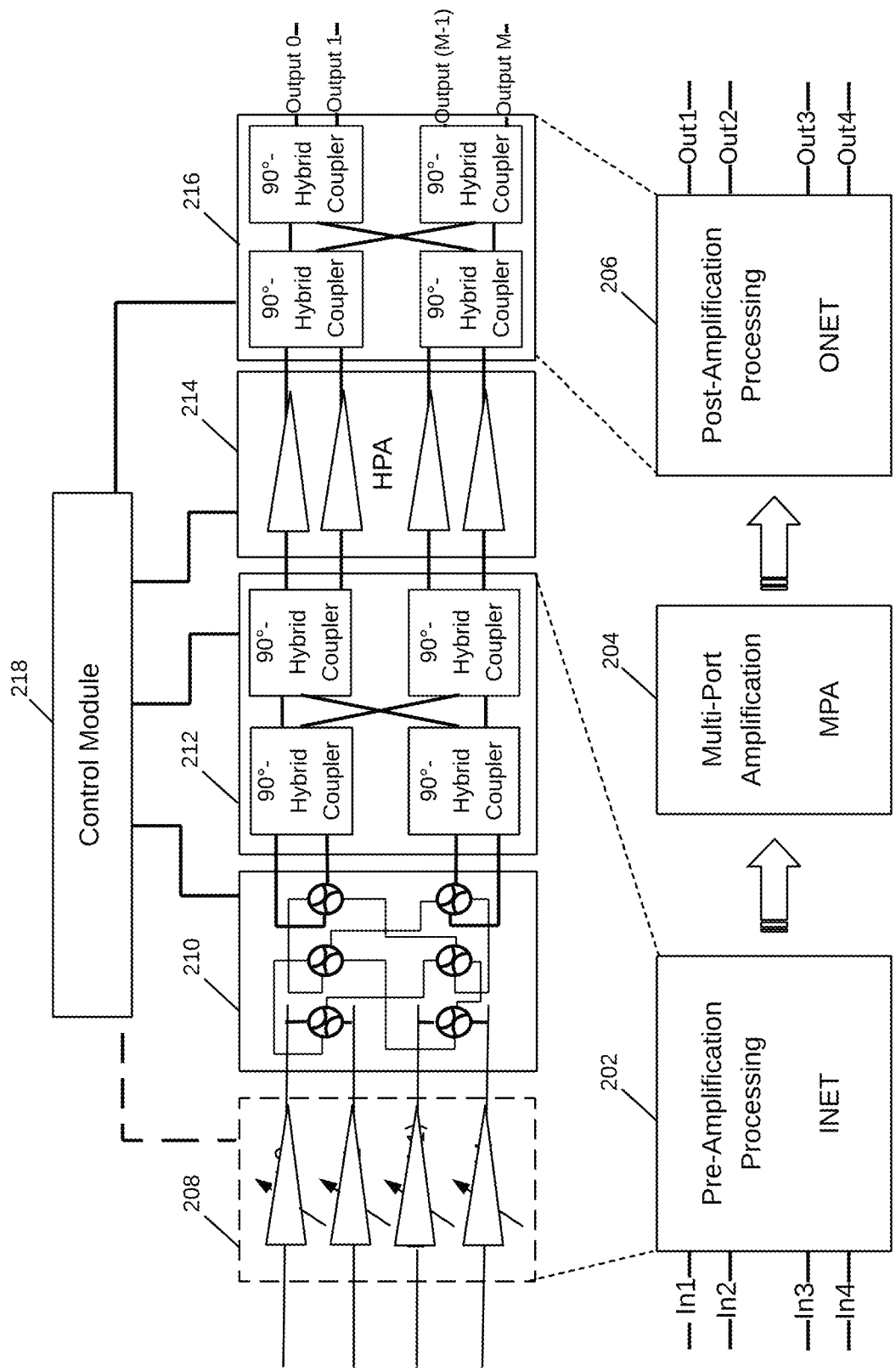
FIG. 2 illustrates a rearrangeable switch network with a power distribution network implemented as in FIG. 1 and in accordance with various examples.

FIG. 2 illustrates such a system incorporating an MPA in accordance with various examples. A functional block diagram 200 shows the amplification process, having a pre-amplification processing stage 202 and a post-amplification processing stage 206. The multi-port amplification portion 204, MPA, performs parallel amplification of the signals input thereto by a stack or bank of power amplifiers. This process provides multiple paths to the output, where power is then shared by the multiple output ports.

Multiple input signals, In1, In2, In3, and In4 are provided to the pre-amplification processing stage 202 for transformation in preparation for the MPA 204. After amplification, the output signals are effectively recombined by post-amplification processing stage 206. Pre-amplification processing 202 includes the INET, where input signals are power-split and phase shifted in preparation for amplification in MPA 204. Post-amplification processing 206 includes the ONET, where the amplified signals are prepared for transmission. Transmission may incorporate all of the output ports, such as Output1, Output2, Output3, and Output4, or may combine into a subset thereof. The power output of each of the output ports may be individually determined, enabling different values of power at each port, rather than a uniform power applied to all signals.

Note that the pre-amplification processing stage 202 corresponds to the level control drivers 208, the switch matrix or network 210 and the hybrid coupler module 212. The 4×4 switch network 210 is a rearrangeable switch network that supports any permutation of four inputs to four outputs. In some examples, the 4×4 switch network 210 includes six (6) C-switches as illustrated. In other examples, various different types of switches other than C-switches may be employed for the switches of the 4×4 switch network 210 including, but not limited to, R-switches, T-switches, and/or cross-bar switches. In addition, the antenna system 100 may be scaled to support any number of inputs to outputs. As such, various different switch networks having various different number of inputs and outputs may be employed instead of a 4×4 switch network 210 for the antenna system 100.

The post-amplification processing stage or ONET 206 corresponds to the hybrid coupler 216, which has output ports for the output signals. The MPA 204 includes the hybrid coupler 212 portion of stage 202, the High-Power Amplifier ("HPA") bank 214 and the hybrid coupler 216 in stage 206. In some examples, the MPA 204 is a matrix amplification network of multiple matrices, where each matrix has M number of input ports and M number of output ports (e.g., M-by-M (M×M) matrices), where M may be equal to two, four, eight, or etc., where M=2, 4, 8, and so on.

The output of a first matrix, referred to as the INET, is input to a power amplifier bank (e.g., HPA bank 214) of M similar (or identical) power amplifiers, such as Traveling-Wave Tube Amplifiers ("TWTAs") and/or Solid State Power Amplifiers ("SSPAs"). The HPA bank 214 provides M number of inputs into a second matrix, i.e., ONET 206, that are the outputs of the power amplifiers in HPA bank 214. The ONET 206 separates the M number of amplified signals into M number of streams at M number of outputs. The INET in pre-amplification processing stage 202 and the ONET 206 may be recursively constructed using ninety-degree hybrid couplers 212 and 216. As such, the INET in pre-amplification processing stage 202 is a first set of hybrid couplers 212, and the ONET 206 is a second set of hybrid couplers 216.

Note that the hybrid couplers 212 and 216 have crossover transmission lines related to the wavelength of the center frequency of operation. When power is introduced to the input ports, the power flows to ports at different phases, such as 0° and 90°. Hybrid couplers split the high-power signals in applications where unwanted reflections could damage driver devices. In some examples, a quadrature hybrid is used to generate two outputs having equal amplitude but a quadrant apart, i.e., 90° apart.

The matrix structure of the power distribution network 108 uses control of the input levels to the power amplifiers in HPA bank 214 to control their output level. Each of the output ports of the power amplifiers in HPA bank 214 corresponds to a different beam 116-120. By adjusting the input power levels to the INET, the output levels of the power amplifiers in HPA bank 214 will be adjusted, and a dynamic and reconfigurable power distribution over the beams 116-120 may be achieved. This feature is highly desirable, for example, in high frequency operations, such as for Ka-band and Q/V-band. However, other frequencies may be utilized for the disclosed antenna system 100 of FIG. 1 including, but not limited to, L-band, C-band, S-band, X-band, and Ku-band.

In some examples, the MPA system 204 composed of hybrid couplers 212, HPA bank 214 and hybrid couplers 216, provides failure resiliency properties. For example, when N number of power amplifiers within the M-dimensional power amplifier array 214 are in an off mode (e.g., an N number of the power amplifiers in bank 214 are not operating) there will be no interruption of operation for the remaining power amplifiers in HPA bank 214 (i.e. M minus N (M−N) number of the power amplifiers in HPA bank 214 will remain operating, for example due to failure or loss of power).

These remaining power amplifiers will continue to work for all M number of paths of the MPA system 204, but with a lower power. The power level will be reduced by a factor of (M−N)/M in some examples. As such, power combining and power dividing may be achieved through control of the individual elements of the MPA system 204. These solutions may be used to implement multi-cast or broadcast messaging and communications. For example, the antenna system 100 of FIG. 1 may be implemented in a multi-beam satellite system and/or a wireless cellular system as described in more detail below.

Also in FIG. 2, the INET in pre-amplification processing stage 202 and the ONET 206 are each shown to comprise a 4×4 configuration of ninety-degree hybrid couplers 212 and 216, respectively. In addition, the power amplifier array (e.g., a HPA bank 214) is shown to comprise four power amplifiers. However, it should be noted that in some examples, the power amplifier array (e.g., a HPA bank) 214 may comprise additional power amplifiers (e.g., HPAs) for added redundancy.

In some examples, the present disclosure implements rearrangeable networks for beam steering and switching on-board a satellite for high data rate space links with high-gain BSPA antennas. BSPA antennas, compared to classical satellite antennas using large size reflectors with mechanical beam steering subsystems, present several advantages, including mass and form factor reduction, electronic beam steering and switching.

System 200 is controlled by control module 218, which may be implemented as one or more modules. Control module 218 may implement desired power requirements, amplification specifics and transmission paths through the system 200. Control module 218 implements an efficient control method to achieve a power regulation requirement based on the rearrangeable switch network 106 and power distribution network 108, which consists of regulating the downlink power so that LEO satellites are able to maintain the coverage Equivalent Isotropically Radiated Power ("EIRP") level for user links and/or service links, while moving in orbit.

In this scenario, one or several BSPA antennas (e.g., BSPA antennas 110-114 of FIG. 1) can also be reconfigured for different purposes. In particular, by steering and/or switching the downlink beams, together with the downlink power regulation, the overall coverage can be updated per operational requirements, and optimized for power efficiency, as expressed in EIRP coverage on several footprints on ground. These functionalities that include switching, multiport amplification, as well as BSPA antennas, altogether, express some requirements for control, monitoring and calibration, among others.

Control module 218 implements a methodology of dynamic control and reconfiguration. The proposed solution is to utilize the power regulation and downlink beam switching capabilities of the proposed flexible payload system architecture to optimize the on-board satellite radio frequency power resource for LEO satellites that are operated in weather varying and moving environments. Due to the number of LEO satellites in a LEO constellation which can be very large, a Telemetry, Telecontrol & Command ("TT&C") subsystem can be overwhelmed and some timing sensitive data must be transmitted in low latency.

It is proposed to share useful data only with LEO satellites in orbit and in service. The various examples, among several others, disclosed herein consist of utilizing the return link to form a local control loop in control module 218 which controls directly the payload downlink channels and beams for power optimization. It is also proposed to transmit and exchange data in IP packets associated with beam manipulation using a virtual network in layer 2 overplayed on the space network between the LEO constellations nodes in view of priority scheduling and fast forwarding in Virtual Local Area Network ("VLAN") frames.

Further, it is proposed to employ a VLAN with switches on board to handle control, monitoring and command data packets either globally with the resource management center, or locally whenever possible and necessary. The VLAN can either have gateways to the satellite space network, or use TT&C, or traffic uplink and downlink links, all controlled by a centralized mechanism.

One of the major benefits of providing link quality information is to alleviate the loading of the satellite network resource management system. This is because in a LEO or Middle Earth Orbit ("MEO") satellite constellation, a highly sophisticated system topology and architecture usually demands a considerable amount of system resources to be used in signaling, monitoring, control and coordination. As the control loop in control module 218 becomes local, the involved system components are limited to the satellite payload and the ground user terminals located in one or several footprints or cells on ground, a virtual L2 local network can be used to support it, without the addressing, layering and the corresponding protocol processing relating the function to other system entities including the hub station, TT&C subsystem, and eventually the network resource management system. Localization of certain control requirements will lead to a reduction of the response time, and the length of the system transient period. The proposed payload architecture and use of a local control loop in control module 218, as compared to classical ones, has a piggyback uplink from user terminals to the satellite via the uplink.

It is appreciated that the proposed VLAN approach can be interfaced with the on-board bus for control, monitoring and command, etc. The VLAN frames encapsulate the IP packets for forwarding and switching, and then delivered as IP packets at the payload bus access nodes. This approach efficiently supports applications such as SNMP for management, and other IP-based applications for payload operations, including the proposed downlink power regulation, downlink beam manipulation including swapping for handover, as well as multiport amplification subsystem calibration and reconfiguration. In some designs, it is also possible to integrate the payload bus and the proposed VLAN into a single VLAN domain so that the bus and payload are managed in a unified way. In this way, priority tasks can be also executed for some time-sensitive applications.

Examples of the potential applications for rearrangeable switch network 210 are illustrated in FIGS. 3A-B, where an initial configuration of a switch network 300 has a first input going to a base station ("BS"), or central unit, A, second input to BS B, third input to BS C, and a fourth input to BS D. In a second configuration shown in FIG. 2B, the switch 302 enables permutation allowing the first input signal to be transmitted to BS B, second input signal to be transmitted to BS D, a third input to be transmitted to BS C, and a fourth input signal to be transmitted to BS A. These are just a few of the permutations that switch network 210 may enable. The switch network 210 enables the system to route signals to different system components within the system with little to no change in the beam generation of BSPA antennas 110-114.

Attention is now directed to FIGS. 4A-B, which illustrate switch networks according to various examples. Switch networks 402-404 are exemplary switch networks that may be employed for the rearrangeable switch network 106 of the power switching and distribution network 102 of FIG. 1. Switch networks 402-404 are each a Benes network comprising multiple base unit switches (e.g., two-by-two (2×2) switches, such as a cross-bar switches or double pole-double throw switch) coupled together. These switch nodes 202 are arranged as a sequence of stages connected by inverse shuffle permutations, wherein an inverse shuffle, $\sigma^{-1}(x)$ may be a right-circular rotation of the binary representation of x as opposed to a left-circular rotation for the ordinary shuffle permutation $\sigma(x)$. The Benes-type network is a rearrangeable network as the switch settings may be rearranged to accommodate any change of input-to-output mapping.

Switch networks 402-404 incorporate base unit switches that may be rearranged (e.g., by various switching combinations) without blocking the signal flow through the switch networks 402-404. This means they are capable of full-throughput as packet switches with various routings. There are a variety of techniques for such routing. As illustrated, this type of network enables configuration to satisfy a variety of scenarios without interruption of information or signal flow through the network. These networks may be implemented for any number of input-to-output (I/O) ports, such as network 402 having 4 inputs and 4 outputs; or may be implemented as network 404 having 8 inputs and 8 outputs. The internal configurations are coupled to allow reconfiguration. As illustrated, the individual elements of networks 402 and 404 are each 2×2 elements. Alternate examples may implement a variety of sizes/configurations.

FIG. 5 illustrates power amplifier (e.g., HPA) banks 500-502 comprising redundant power amplifiers (e.g., HPAs) 508, 516 and 522 and power amplifiers 504-506, 510-512, 514, 518-520, and 524, according to various examples. In some examples, the power amplifier banks 502-504 may be employed for the power amplifier array (e.g., a HPA bank) 214 of the system 200 for added redundancy. Also, in some examples, these power amplifier banks 502-504 may each be implemented as a small cell backhaul configuration for a cellular system, such as for 5G specifications.

As shown in FIG. 5, power amplifier bank 502 is a single redundant amplifier configuration having an additional redundant power amplifier 508 with four inputs and four outputs. As such, for power amplifier bank 502, one power amplifier failure is recoverable without interruption. And, power amplifier bank 504 is a double redundant amplifier configuration having two additional redundant power amplifiers 516, 522 with four inputs and four outputs. As such, for power amplifier bank 504, two power amplifier failures are recoverable without interruption.

Figure 6:
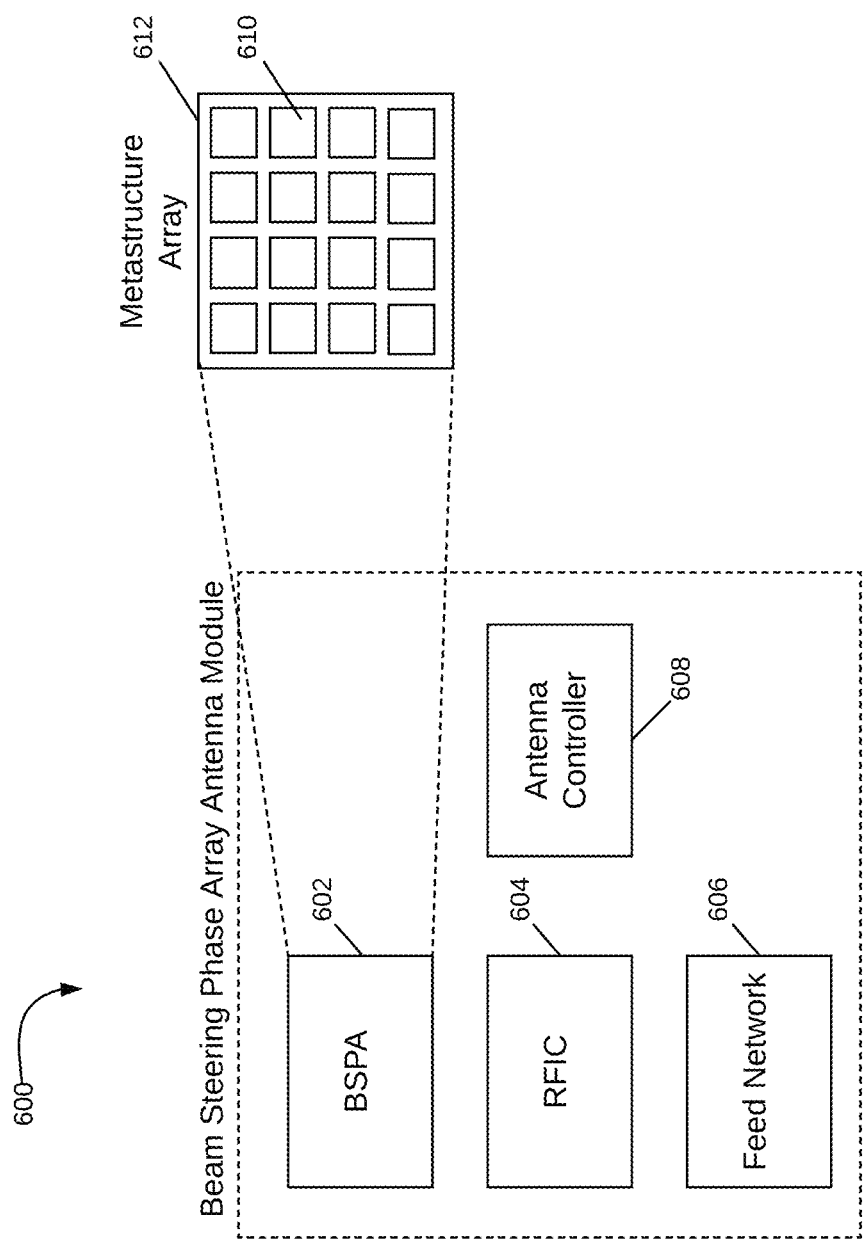
FIG. 6 is a schematic diagram of a BSPA antenna module for use in the antenna system implemented as in FIG. 1 and in accordance with various examples.

Attention is now directed to FIG. 6, which is a schematic diagram of a BSPA module for use in an antenna system implemented as in FIG. 1 and in accordance with various examples. BSPA module 600 includes a dynamically controllable BSPA antenna 602, an RF Integrated Circuit ("RFIC") 604 and a feed network 606. An antenna controller 608 dynamically controls the BSPA antenna 602 at the direction of control module 218, creating transmission beams with specified parameters, such as beam width, beam direction, and so forth, to achieve a power regulation requirement for a set of LEO satellites.

In various examples, the BSPA antenna 602 may be a metastructure antenna or any other antenna capable of radiating RF signals in millimeter wave frequencies. A metastructure, as generally defined herein, is an engineered, non- or semi-periodic structure that is spatially distributed to meet a specific phase and frequency distribution. A metastructure antenna is composed of multiple metastructure antenna elements positioned in a metastructure array, as shown with element 610 in metastructure array 612. The metastructure antenna elements may include microstrips, gaps, patches, vias, and so forth. The elements in a given metastructure array may have a variety of shapes and configurations and be designed to meet certain specified criteria, including, for example, desired beam characteristics for a fixed wireless network operating within the 5G standard.

In some examples, the metastructure antenna elements are metamaterial cells in a variety of conductive structures and patterns, such that a received transmission signal is radiated therefrom. Each metamaterial cell may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating electromagnetic waves by blocking, absorbing, enhancing, or bending waves.

Active circuit components in RFIC 604 are able to provide RF signals at multiple steering angles to beam steering antenna 602, which then radiates these signals according to their steering angles. The RFIC 604 includes phase shifting circuitry to provide phase shifts to the beam steering antenna elements in a full 360° direction. The phase shifting circuitry may include phase shifters such as a phase shift network, a vector modulator architecture, a varactor-based phase shifter, and so on. The phase shifting circuitry is fed by feed network 606, which is a power divider structure having a plurality of transmission lines for transmitting an RF signal to the phase shifters in RFIC 604.

Figure 7B:
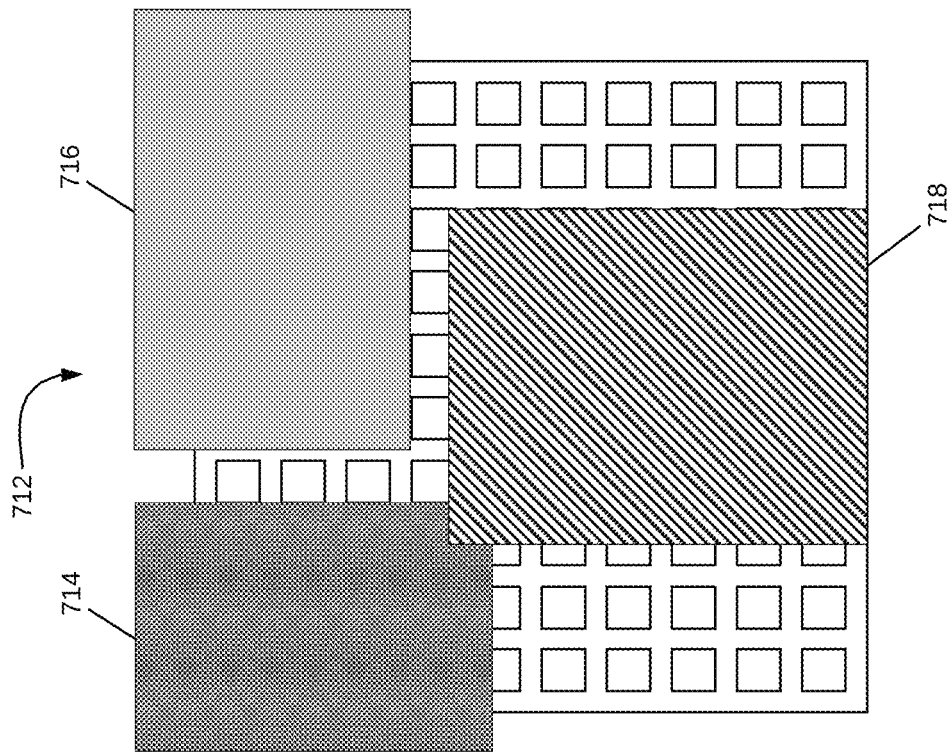
FIGS. 7A-B are schematic diagrams illustrating subarrays of a BSPA antenna in accordance with various examples.
Figure 7A:
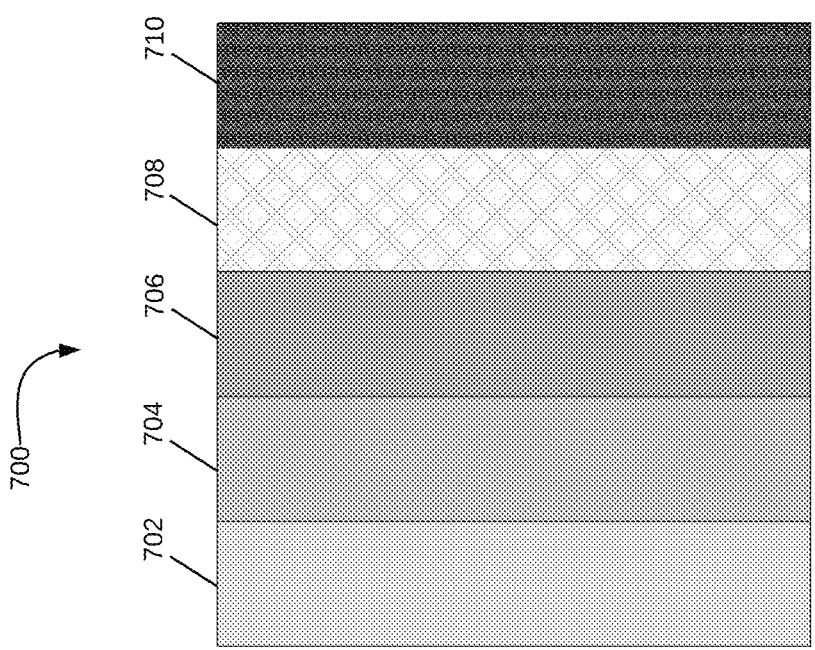

In various examples, the BSPA antenna 602 may be divided into subarrays, such as illustrated in FIGS. 7A-B. In FIG. 7A, antenna array 700 is made up of plurality of metastructure antenna elements which may be dynamically arranged into arrays of multiple elements. In this particular scenario, there are subarrays 702-710, where each subarray generates a specific beam for transmission. These subarrays may operate individually and in coordination with a single beamform. The five subarrays may generate five separate and distinct beams, wherein the shape and direction of each beam is unique. The five separate beams may support transmission of five different and unique transmissions concurrently. FIG. 7B illustrates three other subarrays 714-718 that may be configured in antenna array 712. These subarrays are configured by the antenna controller 608, which controls the signal(s) input to each of the specific subarrays according to a desired phase shift generated by RFIC 604 for one or more of the antenna elements within a subarray. The configuration, arrangement and control of the subarrays is as flexible as the antenna controller 608 and feed network 606 support.

Figure 8:
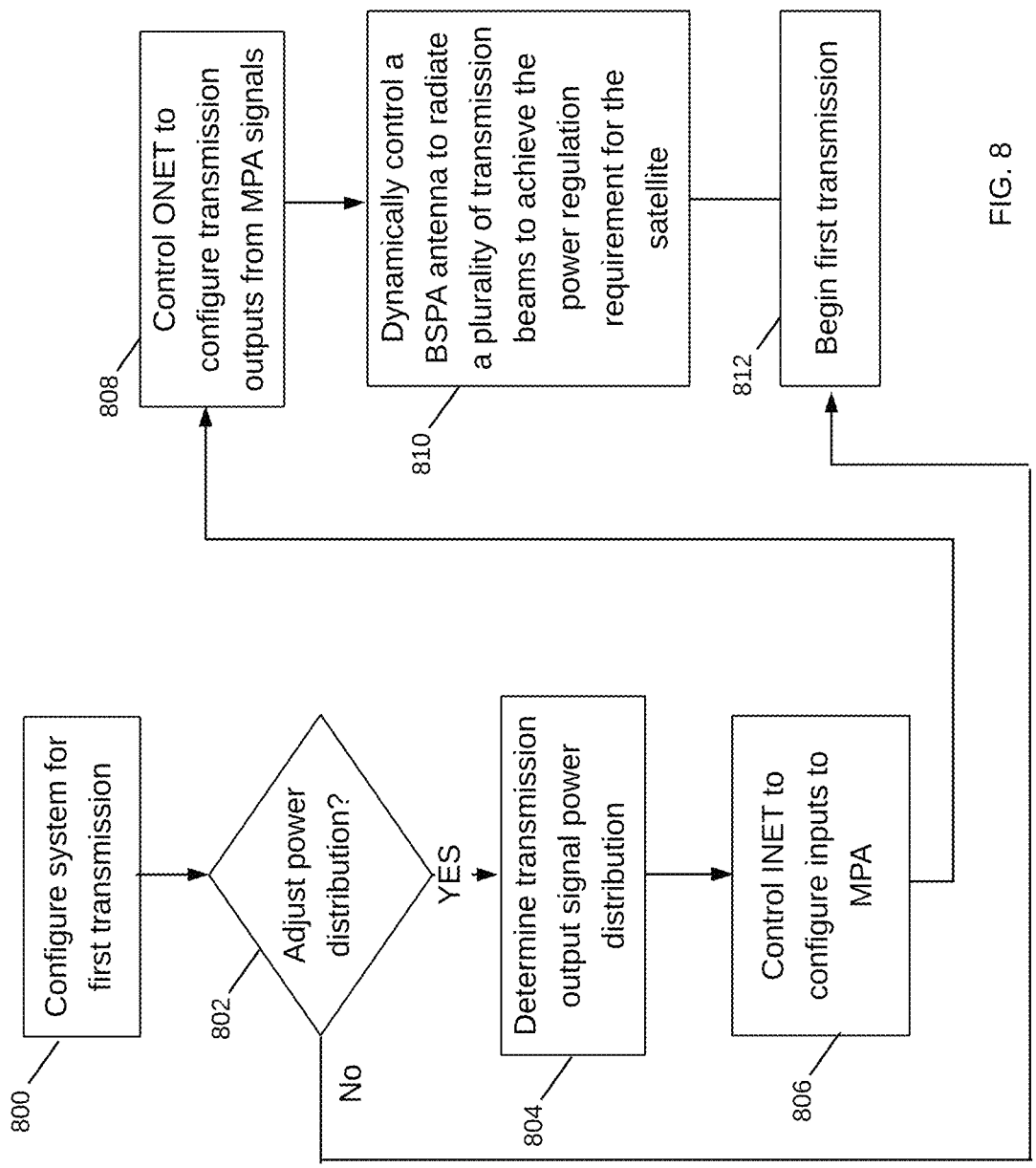
FIG. 8 is a flowchart for operating an antenna system implemented as in FIG. 1 and according to various examples.

Attention is now directed to FIG. 8, which illustrates a process for operating an antenna system in a satellite according to various examples. The process first configures the system for a first transmission (802). The first transmission may be to one or more base stations or other receivers within a communication system. The system then determines whether to adjust the power distribution for the first transmission according to a power regulation requirement for the satellite (802), and if not, begins the transmission (812). When the power distribution is to be adjusted, the process determines the transmission output signal power distribution (804). The process then controls INET portion of system to configure inputs to the MPA (806), and then controls ONET to configure transmission outputs from the MPA signals (808). The process then dynamically controls a BSPA antenna to radiate a plurality of transmission beams to achieve a power regulation requirement for the satellite (810) before beginning the transmission (812).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A communication system, the system comprising:
a transceiver module;
a rearrangeable switch network coupled to the transceiver module;
a power distribution network coupled to the rearrangeable switch network; and
a plurality of Beam Steering Phase Array ("B SPA") antennas, each coupled to the power distribution network and dynamically controllable to generate beams according to a power regulation requirement for a set of satellites.

2. The communication system of claim 1, wherein the rearrangeable switch network comprises a Benes network.

3. The communication system of claim 1, wherein the rearrangeable switch network comprises one of C-switches, R-switches, T-switches, or cross-bar switches.

4. The communication system of claim 1, further comprising a bank of level control drivers connected to the rearrangeable switch network.

5. The communication system of claim 1, wherein the power distribution network is a multi-port amplification ("MPA") matrix comprising:
a first set of hybrid couplers;
a second set of hybrid couplers coupled to a plurality of antenna elements; and
a power amplifier bank connected to the first set of hybrid couplers and the second set of hybrid couplers.

6. The communication system of claim 5, wherein the first set of hybrid couplers and the second set of hybrid couplers both comprise ninety-degree hybrid couplers.

7. The communication system of claim 5, wherein the first set of hybrid couplers and the second set of hybrid couplers each comprise at least two inputs and at least two outputs.

8. The communication system of claim 5, wherein the power amplifier bank comprises high power amplifiers ("HPAs").

9. The communication system of claim 8, wherein the HPAs are one of traveling wave tube amplifiers ("TWTAs") or solid state power amplifiers ("SSPAs").

10. The communication system of claim 5, wherein the power amplifier bank comprises at least one redundant power amplifier.

11. The communication system of claim 5, wherein at least one of the plurality of antenna elements transmit or receive electromagnetic ("EM") signals in beams.

12. The communication system of claim 11, wherein the electromagnetic signals comprise at least one of L-band, S-band, C-band, X-band, Ku-band, Ka-band, and Q/V-band frequencies.

13. The communication system of claim 1, wherein each BSPA antenna is integrated in a BSPA antenna module comprising:
a feed network comprising a power divider structure having a plurality of transmission lines to transmit a plurality of radio frequency (RF) signals;
a radio frequency integrated circuit (RFIC) coupled to the feed network to receive the plurality of RF signals and generate phase shifts at multiple steering angles; and
an antenna controller configured to dynamically control the each B SPA antenna to radiate a plurality of transmission beams from the RF signals, each transmission beam having a beam width and a beam direction to achieve the power regulation requirement for the set of satellites.

14. The communication system of claim 1, wherein the set of satellites comprises one of a low earth orbit ("LEO") satellite, a medium earth orbit ("MEO") satellite, or a geosynchronous earth orbit ("GEO") satellite.

15. A power distribution network for a communication system, the network comprising:
a multi-port amplification bank;

a pre-amplification processing module coupled to an input to the multi-port amplification bank;

a post-amplification processing module coupled to an output of the multi-port amplification bank;

a Beam Steering Phase Array ("BSPA") antenna coupled to a plurality of outputs of the post-amplification processing module; and a control module configured to dynamically control the BSPA antenna to generate a plurality of beams according to a power regulation requirement for a set of satellites.

16. The power distribution network of claim 15, wherein the pre-amplification processing module comprises an Input Multiport Network (INET) of hybrid couplers.

17. The power distribution network of claim 15, wherein the post-amplification processing module comprises an Output Multiport Network (ONET) of hybrid couplers.

18. The power distribution network of claim 15, wherein the BSPA antenna is integrated in a BSPA antenna module comprising:

a feed network comprising a power divider structure having a plurality of transmission lines to transmit a plurality of radio frequency (RF) signals;

a radio frequency integrated circuit (RFIC) coupled to the feed network to receive the plurality of RF signals and generate phase shifts at multiple steering angles; and an antenna controller coupled to the control module and configured to dynamically control the BSPA antenna to radiate a plurality of transmission beams from the RF signals, each transmission beam having a beam width and a beam direction to achieve the power regulation requirement for the set of satellites.

19. A method for operating an antenna system in a satellite, comprising:

configuring the antenna system for a first transmission;

determining whether to adjust a power distribution for the first transmission according to a power regulation requirement for the satellite; and dynamically controlling a Beam Steering Phase Array ("BSPA") antenna to radiate a plurality of transmission beams, each transmission beam having a beam width and a beam direction to achieve the power regulation requirement for the satellite.

20. The method of claim 19, further comprising controlling an Input Multiport Network (INET) network to configure inputs to a multi-port amplification (MPA) and controlling an Output Multiport Network (ONET) network to configure transmission outputs from the MPA, the transmission outputs transmitted to the BSPA.

* * * * *